US010315327B2

(12) United States Patent
Byström

(10) Patent No.: US 10,315,327 B2
(45) Date of Patent: Jun. 11, 2019

(54) SAW DEVICE

(71) Applicant: Mattias Byström, Härnösand (SE)

(72) Inventor: Mattias Byström, Härnösand (SE)

(*) Notice: Subject to any disclaimer, the term of this patent is extended or adjusted under 35 U.S.C. 154(b) by 9 days.

(21) Appl. No.: 15/617,643

(22) Filed: Jun. 8, 2017

(65) Prior Publication Data

US 2017/0355096 A1 Dec. 14, 2017

(30) Foreign Application Priority Data

Jun. 8, 2016 (SE) ...................... 1650795

(51) Int. Cl.
*B23D 55/02* (2006.01)
*B27B 13/02* (2006.01)
*B27B 13/04* (2006.01)

(52) U.S. Cl.
CPC ............ *B27B 13/04* (2013.01); *B23D 55/026* (2013.01); *B27B 13/02* (2013.01)

(58) Field of Classification Search
CPC ........ B27B 13/00; B27B 13/04; B23D 55/00; B23D 55/02; B23D 55/023; B23D 55/026; B23D 55/06; B23D 55/065; Y10T 83/7195; Y10T 83/722
See application file for complete search history.

(56) References Cited

U.S. PATENT DOCUMENTS 3,926,086 A * 12/1975 Crane ................... B27B 17/005 83/745
4,134,203 A * 1/1979 Grube .................. B23Q 9/0028 30/371
4,244,104 A * 1/1981 Grube .................. B23Q 9/0028 30/371
4,245,535 A * 1/1981 Lockwood ............ B27B 17/005 241/605
4,307,641 A * 12/1981 Shapleigh ............. B27B 17/005 83/495
4,660,454 A * 4/1987 Elsey ...................... B27B 15/02 83/574

(Continued)

FOREIGN PATENT DOCUMENTS

CA 2 541 734 10/2007
CA 2 806 456 4/2013
(Continued)

*Primary Examiner* — Jason Daniel Prone
*Assistant Examiner* — Richard D Crosby, Jr.
(74) *Attorney, Agent, or Firm* — Nixon & Vanderhye P.C.

(57) ABSTRACT

A saw device for split sawing of elongated timber elements has at least two upright post elements horizontally spaced from each other, each of which in a lower portion is adapted to support the saw device. An elongated, lying guide beam is supported in the upper portions of the post elements and is adapted to displaceably carry a saw assembly along the longitudinal extent of the guide beam. Each of at least two lying timber carriers projects perpendicular from and are displaceable in height along a respective post element. Each of the timber carriers is formed as a console beam which is upwards and downwards displaceable and unturnably connected with the respective post element, and is displaceable by a rotatable threaded rod which is rotatably beared in the post element, extends in its height and engages a threaded hole in the rear portion of the timber carrier.

9 Claims, 10 Drawing Sheets

(56) References Cited

U.S. PATENT DOCUMENTS

| | | | | | |
|---|---|---|---|---|---|
| 4,711,032 | A | * | 12/1987 | Rickmers | B23D 53/003 |
| | | | | | 30/372 |
| 5,046,391 | A | * | 9/1991 | Lewis | B23D 45/024 |
| | | | | | 144/376 |
| 5,213,022 | A | * | 5/1993 | Elgan | B23D 53/04 |
| | | | | | 83/797 |
| 5,784,941 | A | * | 7/1998 | Sanborn | B27B 17/005 |
| | | | | | 83/471.2 |
| 6,722,248 | B1 | * | 4/2004 | Johnston, Sr. | B27B 15/02 |
| | | | | | 144/378 |
| 7,882,772 | B2 | * | 2/2011 | Wise | B27B 27/02 |
| | | | | | 83/468.2 |
| 8,261,645 | B2 | * | 9/2012 | Dale | B27B 29/08 |
| | | | | | 144/242.1 |
| 8,276,493 | B2 | * | 10/2012 | Dale | B23D 55/02 |
| | | | | | 83/788 |
| 8,479,628 | B2 | * | 7/2013 | Dale | B27B 17/00 |
| | | | | | 83/13 |
| 9,102,074 | B2 | * | 8/2015 | Dale | B27B 29/00 |
| 2014/0318342 | A1 | * | 10/2014 | Koegel | B23D 45/068 |
| | | | | | 83/477.1 |
| 2017/0355096 | A1 | * | 12/2017 | Bystrom | B27B 13/02 |

FOREIGN PATENT DOCUMENTS

| | | |
|---|---|---|
| EP | 0 103 345 | 3/1984 |
| SE | 465 070 | 2/1989 |
| WO | WO 93/19908 | 10/1993 |

* cited by examiner

SAW DEVICE

CROSS-REFERENCES TO RELATED APPLICATIONS

This application claims the benefit of Swedish Patent Application No. 1650795-6, filed Jun. 8, 2016, the entire content of which is herein incorporated by reference.

BACKGROUND OF THE INVENTION

The present invention relates to a saw device for split sawing of elongated timber elements, comprising at least two upright post elements horizontally spaced from each other, each of which is in a lower part adapted to supportive carry the saw device, an elongated, lying guide beam which is supported in the upper portions of the post elements and which is adapted to displaceably carry a saw assembly along the longitudinal extent of the guide beam and at least two lying timber carriers each perpendicular projecting from and being slidable along a respective post element.

Saw devices or saw mills of the initially mentioned kind are known since earlier through e.g. SE465070 and WO 93/19908. Commonly, for these known saw devices each of the timber carriers comprises a lying timber carrier element which is mounted at an upper end of a standing timber carrier element which in turn is displaceably controlled upwards and downwards in a control arrangement mounted on a lying cross beam on a distance from the ground/support. The cross beam is supported in one end of a short leg while the other end of the cross beam is connected with the post element which in turn carries the guide beam in an upper end. By crank operated wires the timber carriers are displaceable upwards and downwards through the control arrangements and can be locked in selectable positions by means of sprints through holes in the standing timber carrier element to keep a tree trunk to be sawn at an appropriate height in relation to a saw sword or a bandsaw blade which is displaceable along the guiding beam.

Such saw devices have a simple, cost-effective structure and low weight, operates in a satisfactory way and achieves an excellent sawing result. They are well suited for small scale sawing of tree logs. One disadvantage, though, is that the timber carriers only can be lowered a limited distance when loading new logs, especially, the timber carriers may can only be lowered until the standing timber carrier element's lower ends abut the ground or the support. This results in that manual loading of logs may be very laborious with heavy lifts and risk of injuries, alternatively that a substantially high ramp has to be arranged to roll the logs upwards or to make use of some kind of crane.

Another disadvantage is that thickness settings at sawing not easily may be made stepless but normally instead is performed in predetermined steps which are determined by the distance between the holes through the standing timber carrier elements. Stepless setting may be achieved by some form of clamp arrangement that clamps each of the standing timber carrier elements instead of fixating them by means of a sprint through a hole. Fresh un-sawed logs may though have a substantial weight and such a clamping arrangement must be made really operation safe and powerful, both to ensure a fixed level keeping of the log during sawing and thereby become sawed timber with large dimensional accuracy, and to avoid that the log unintentionally fall down with risk for injuries on persons and equipment.

BRIEF DESCRIPTION OF THE INVENTION

The present invention aims to improve saw devices or sawmills of the initially mentioned kind and to achieve a saw device at which the timber carrier can be lowered further lower, closer to the ground or the support than at earlier known saw devices. At least this object is achieved with a saw device according to patent claim 1.

The basis of the invention thus lies in the understanding that the above object can be achieved by a saw device in which each of the timber carriers is formed as a console which is upwardly and downwardly displaceable and unturnably connected to respective post element and is displaceable by a rotatable, threaded rod which is rotatably beared in the post element, extends to its height extent and engages a threaded hole in a rear portion of the timber carrier.

With a saw device designed this way the large advantage is achieved that the timber carriers can be lowered such that their timber carrying upper surfaces are substantially nearer the ground or other support than what have been possible with similar, prior known saw devices. Hereby, loading of un-sawed logs on the timber carriers, is largely facilitated. In a below described and in figures illustrated exemplifying embodiment, it is e.g. possible to lower the timber carriers so long that their upper surfaces will be less than 35 cm, preferably less than 30 cm and most preferred less than 25 cm above a support, in form of e.g. the ground or a floor, when the saw device is placed with the lower ends of the post elements or with a support part against this.

It is understood that the invention may be varied and modified in many different ways within the scope of the following patent claims. For instance, an exemplifying embodiment of a saw device is illustrated and disclosed below according to the invention, which comprises a guide beam which is carried by three post elements. However, it is to be understood that it may be possible to equip the saw device with as well more or less post elements, but at least two. The guide beam is further mounted at the back of the respective post element and shows a vertical guide plan which is formed by two upward respectively downward projecting flange edges from the back side of the guide beam.

However, it shall be understood that the guide beam also may be mounted on the upper side of the post elements and have any other arbitrary cross-section describing a guide plan in any other arbitrary direction, e.g. horizontal.

Further is the saw device according to the exemplifying embodiment provided with foot-, or support-members in the lower ends of the post elements. This is advantageous because the saw device hereby may be made self-carrying such that it is easily arrangeable at arbitrary places and thereby may be utilised as a mobile saw device. The support parts might thus also be dispensed in the case that the saw device is directed to be utilised for stationary purposes and might in this case be fastened in the lower ends of the post elements via e.g. in-molded bolts of a concrete floor, that extend through holes in flanges of the post elements.

In the illustrated and disclosed exemplifying embodiments the rotation of the threaded rod is performed in the respective post element, and consequently the height setting of the timber carriers, by means of electric driven motors. Further the motors of the exemplifying embodiment are implemented as stepping motors. Hereby, strictly the height setting will not be absolutely stepless but in a preferred implementation each drive step of the stepping motors will correspond a height change of only about 0.1 mm which in practice means substantially stepless because many other variables in conjunction with wood sawing, such as shrinkage and deformation of the timber, are substantially larger than so. The electric motors would of course also be able to be driven stepless but the regulation with respect to the predetermined setting of the timber carriers would then be more complicated and inexact to perform. With stepmotors on the other hand, it is relatively simple to automatically, via an electric control arrangement, predetermine and count the number of steps that each motor is driven, such as e.g. all motors are regulated exactly as much. Dimensional accuracy and uniformity of the sawed timber thus becomes better in comparison to steplessly driven motors. However, it shall be understood that electric motors also could be replaced and that height setting could be manually performed, e.g. by means of a crank which engages any form of engagement means in the upper end of each threaded rod or in any form of worm gear that affects the rod.

With such a saw device, the height setting of the timber carriers, and hence the timber pieces, would of course not be possible to perform as quickly and easily. However, the advantage of being able to lower the timber carriers near the support and minimize the heavy lifts when loading timber logs will still be present, and furthermore the production cost could be significantly reduced. An additional advantage of carrying out the height control by threaded rods is that they are self-locking in normally used thread hitches, i.e. they can also hold very heavy loads stationary at a height set without need for any additional locking device that prevents downward movement of the load.

In the following exemplifying embodiment, the movability of the timber carriers in the post elements has been accomplished by two pairs of rollers or wheels in a rear portion of respective timber carriers which run in a slot in the post element on either side of the rear portion of the timber carrier. However, it shall be understood that the invention is not limited to this embodiment, but the parallel displacement of the timber carriers up and down relative to the post elements in both vertical and horizontal direction could be achieved in many other ways, e.g. by slide bearings instead of rollers. For example, by arranging plastic sliding slabs that slide towards metal surfaces.

In patent claim 1, it is stated that the posts are "upright" while the wood carriers are "lying" and in the following description and in the figures, an exemplifying embodiment is shown and described in which the front side of the post elements are vertical while the upper surfaces of the timber carriers are horizontal at the preferred arrangement of the saw device on a flat horizontal support. However, it should be understood that the invention is not limited to that the front side of the post elements and the upper surfaces of the timber carriers should be strictly vertical and horizontal, respectively. It would namely be possible to design the post elements in such a way that their fronts slightly lean back slightly while the upper surfaces of the timber carriers lean upwards in the direction forward of the post elements. Such an embodiment could be advantageous because the timber pieces to be sawn thereby automatically will be pressed against the front side of the post elements by the impact of gravity. However, it is still important that the angle between the front side of the post elements and the upper surfaces of the timber carriers are perpendicular to obtain sawn beams, bars and boards with mutually perpendicular sides.

In the exemplifying embodiment described and illustrated hereinafter, the saw device is provided with a saw assembly in the form of a bandsaw driven by a combustion engine. It will be understood, however, that the saw assembly could be of another suitable type, for example a chain saw or a circular saw, and could also be driven by, for example, an electric or hydraulic motor.

It will further be understood that the terms "front side", "front", "forward", etc. used herein refer to position, location and/or direction relative to or against the timber side of the saw device, i.e. the side where the timber pieces are intended to be placed for sawing, while the terms "rear side", "rear", "back", etc. refer to position, location and/or direction relative to or against the manoeuvre side of the saw device, i.e. the side where a user is intended to be placed during sawing.

BRIEF DESCRIPTION OF THE FIGURES

Hereinafter follows a detailed description of an exemplifying embodiment of a saw device according to the invention and with reference to the accompanying drawings, of which.

DETAILED DESCRIPTION OF AN EMBODIMENT OF THE INVENTION

Figure 1:
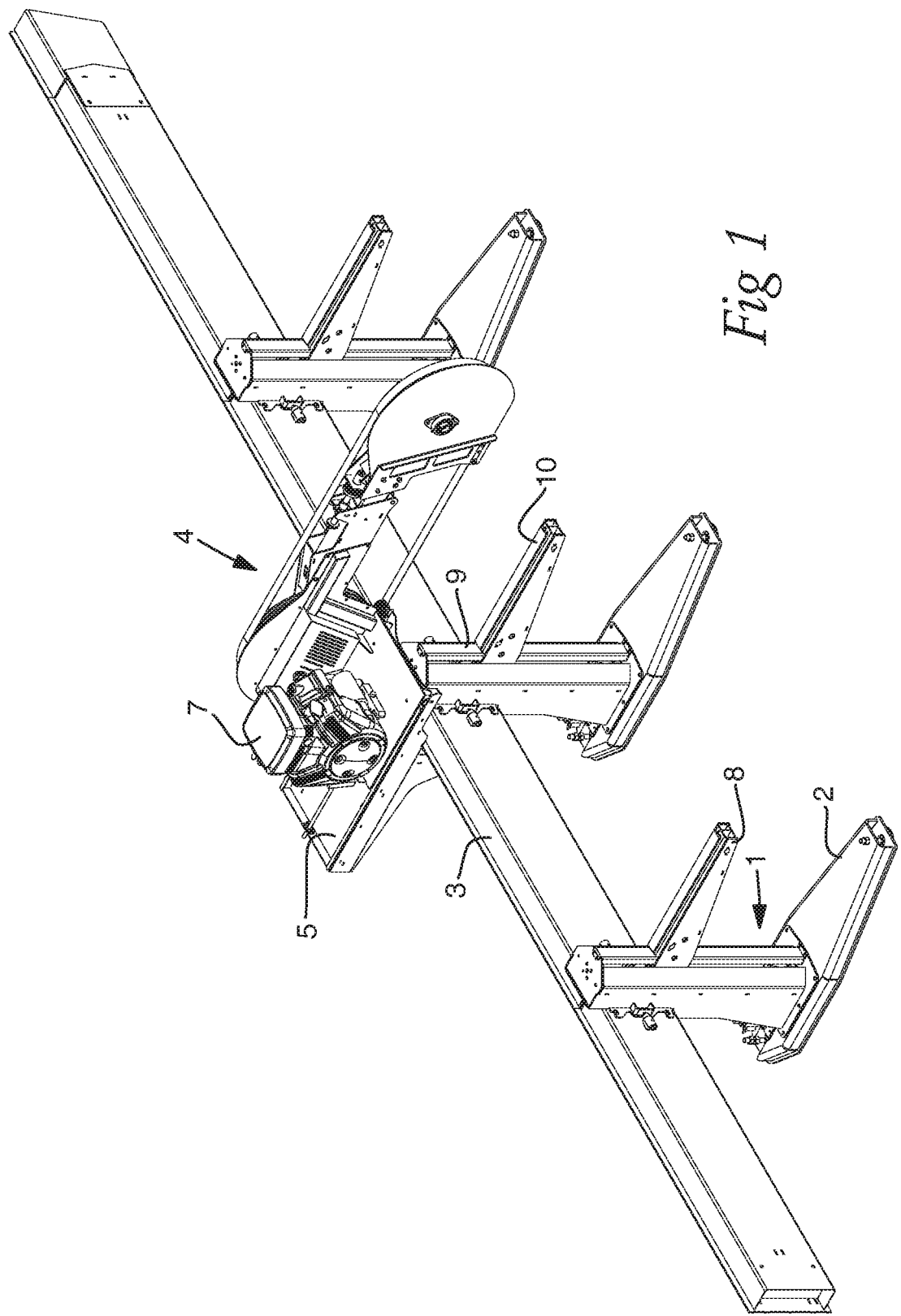
FIG. 1 is a perspective view of a saw device according to the invention seen from the timber side.
Figure 2:
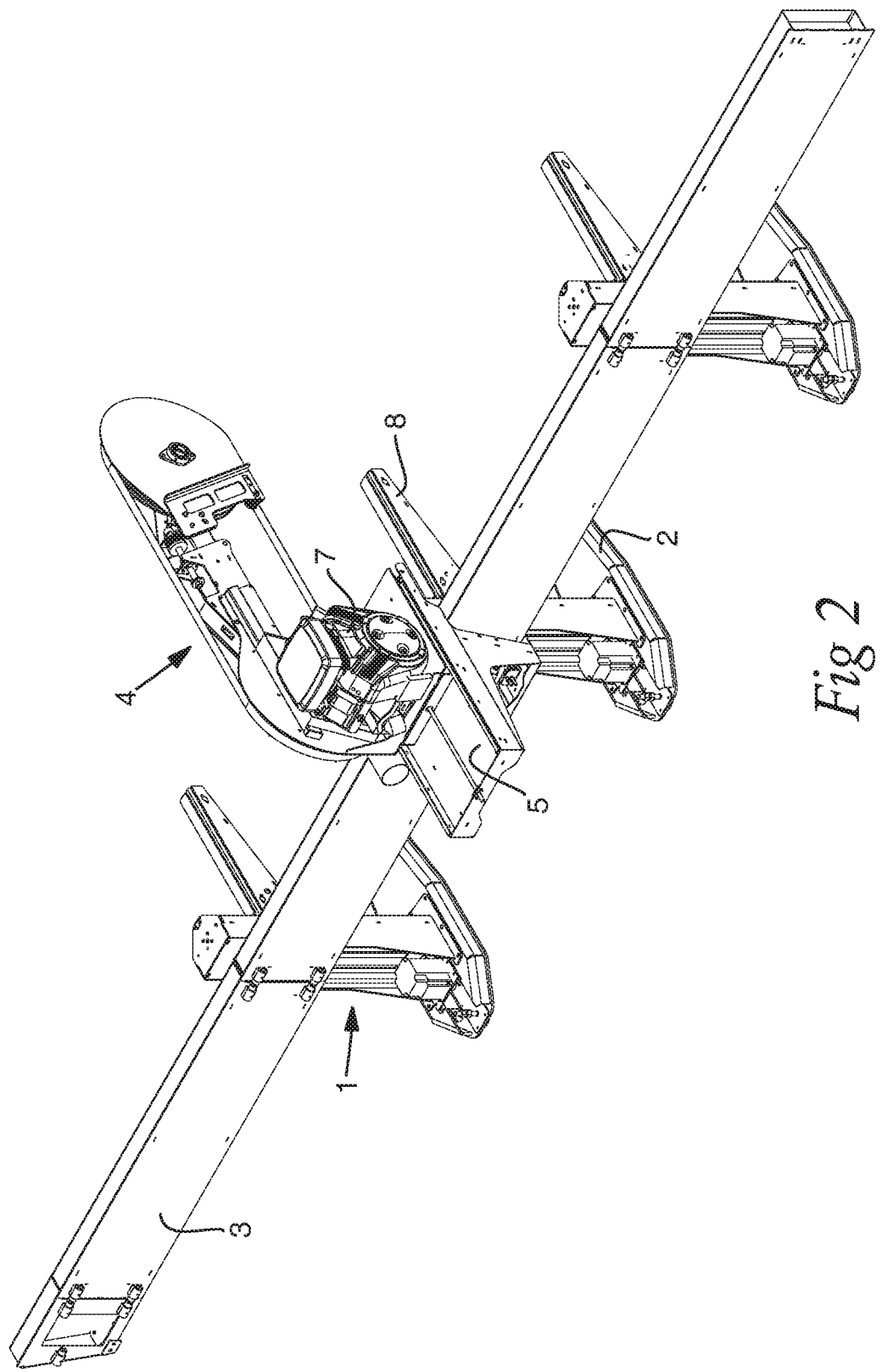
FIG. 2 is a perspective view according to FIG. 1 seen from the manoeuvre side.

First is referred to the perspective views in FIGS. 1 and 2 for an overview description of the comprised main parts of a saw device according to the invention.

In the shown embodiment, this comprises three post elements 1 which are placed about 1.5 m apart and each of which in its lower end is provided with a support part 2 for abutment against a support and, in its upper ends, together carries a preferably horizontal lying guide beam 3. The support parts 2 have a sufficiently long horizontal extent to ensure stable and safe positioning of the saw device on a support even when a heavy tree log is worn on it. The guide beam is intended to carry a saw assembly 4 displaceable along the longitudinal extent of the guide beam. For this purpose, the saw assembly 4 is mounted on a sleigh assembly 5 which is displaceable along the guide beam 3 and the saw assembly consists of a bandsaw which is drivable by a combustion engine 7, e.g., a gasoline engine. An upwardly and downwardly adjustable timber carrier 8 protrudes at an angle from a front side of each of the post elements 1 and the timber to be sawn is intended to be placed on the upper surfaces of the three timber carriers and can be height adjusted by means of these in relation to the saw assembly. The angle between a front surface 9 of respective post element and an upper surface 10 of its associated timber carrier is 90° to facilitate sawing of, for example, round logs to boards, plank and blocks having adjacent side surfaces perpendicular to each other.

Figure 6:
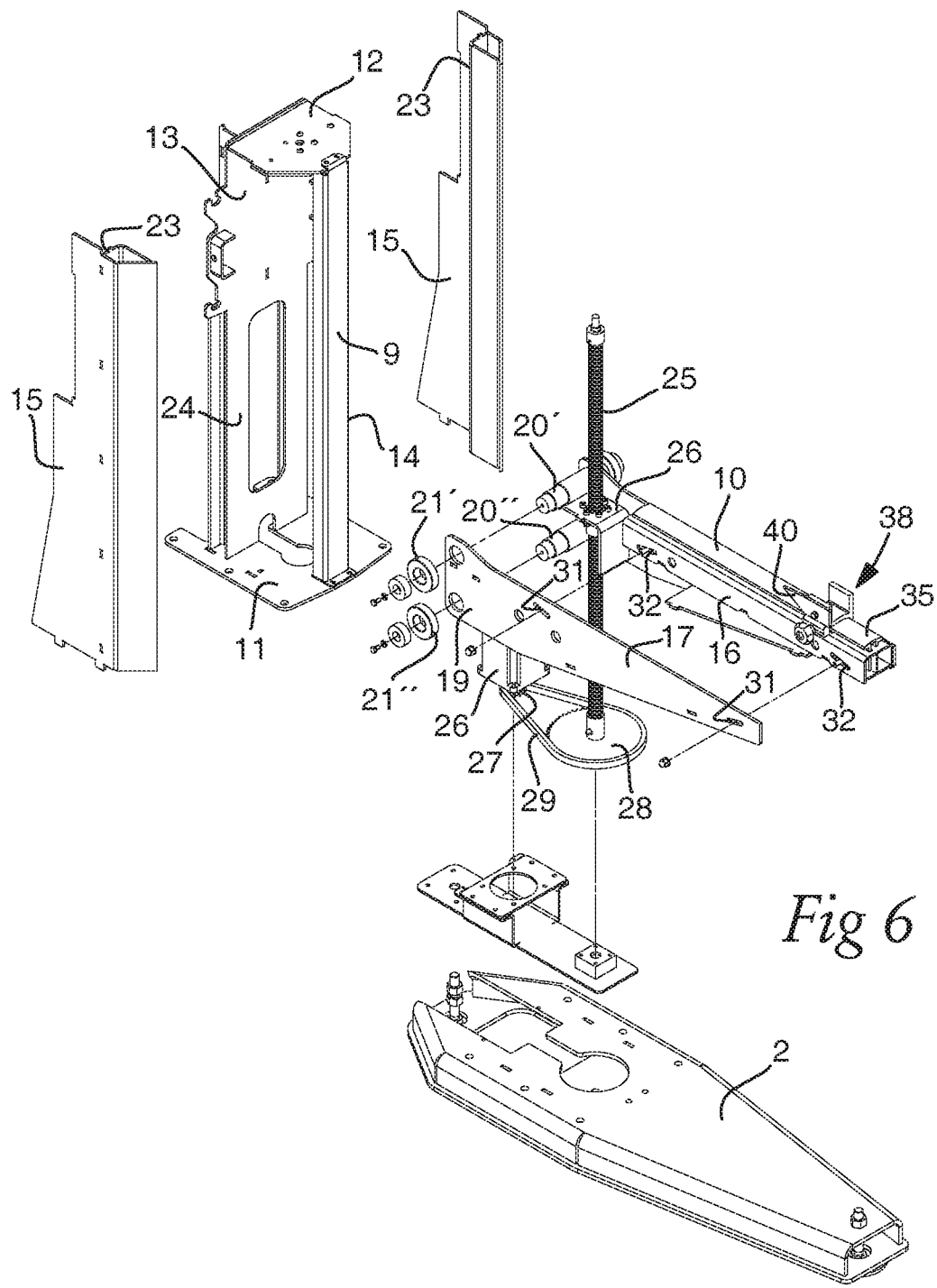
FIG. 6 is a perspective exploded view of a post element.
Figure 7:
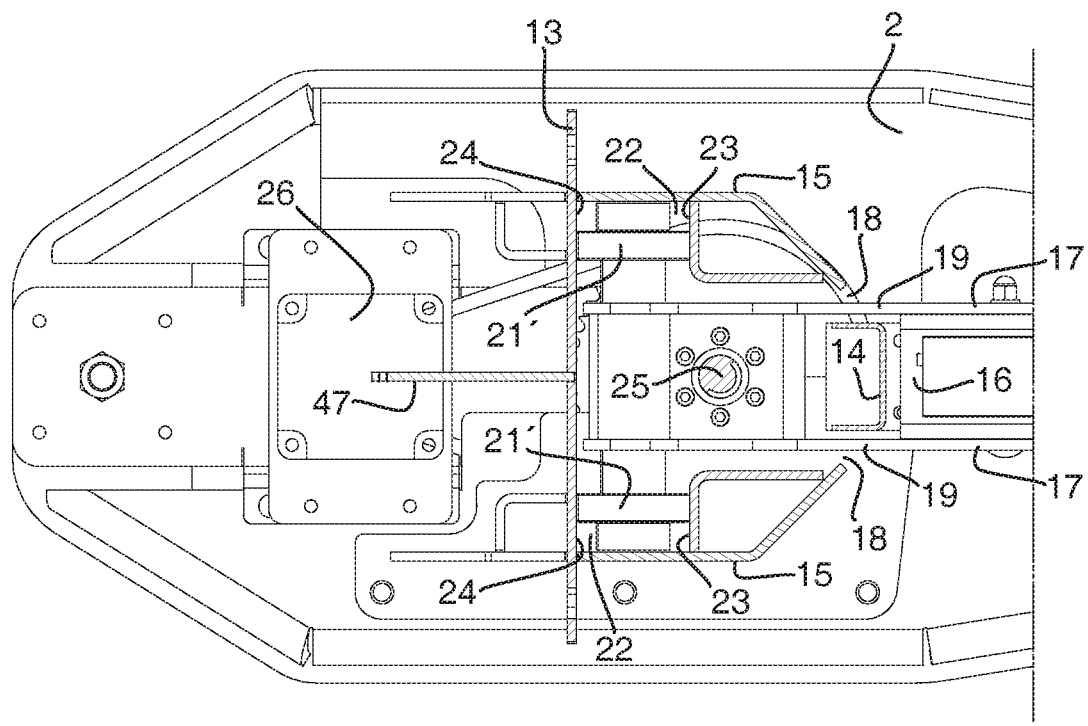
FIG. 7 is a cross section through the post element along the line VII-VII in FIG. 3.

Next, reference is made to FIGS. 3 to 7 for a detailed description of a height setting mechanism according to the invention for vertical displacement and height setting of a timber carrier 8 relative to a post element 1. The height setting mechanism may be used both for setting the height of timber to be sawn and for performing height adjustments of it. In the embodiment shown, the post element is box-shaped and comprises a bottom piece 11, an upper piece 12, a back piece, a front piece 14, and two bent side pieces 15. The timber carrier is formed of a bar 16 with a hollow four-sided cross section which is surrounded by and is screwed with a flat console piece 17 on either side. The front part 14 of the post element, which has a U-shape in cross-section, has a width substantially equal to the width of the four-side bar 16 of the timber carrier, and on each side of the front piece there is a slit 18 between the front piece 14 and the respective side piece 15 in such a way that each of the slits forms an opening into the hollow interior of the post element. A rear end of the timber carrier's respective console piece 17 extends further backward than the rear end of the four-side bar. In the assembled state of the post element and the timber carrier, as shown in, for example, FIGS. 3-5 and the cross-section of FIG. 7, a rear portion 19 of the console pieces extends through the slits 18 on either side of the front piece 14 of the post element while the rear end of the four-side bar 16 ends with a small distance from the front piece's front side. The rear portions 19 of the console pieces are connected to each other via two axes 20', 20" which extend through the console pieces and are provided with rotatable rollers 21', 21" or wheels at each end of the outside of the respective console piece. In mounted state, these rolls are paired disposed one above the other and located the in respective opposing guide slits 22 or -grooves which are defined between a rearwardly faced abutment surface 23 on the inside of the respective side piece 15, which are formed by bending of the side pieces, and a forwardly faced abutment surface 24 on the inside of the rear piece 13 as best seen in FIG. 7. Hereby, the timber carrier 8 is parallel-displaceable upwardly and downwardly and rotation prevented in both vertical and horizontal direction by that the upper rollers 21' of respective roller pairs engages and rotates against the rearwardly faced abutment surface 23 while the lower rollers 21" of respective roller pairs engage and rotate against the forwardly faced abutment surface 24.

To achieve height shift and height adjustment of the timber carrier relative to the post element, a rotatable outwardly threaded rod 25 is arranged within the post element parallel to its front piece 14 and more specifically, the threaded rod is with its one end rotatably beared in the support part 2 and with its second end of the upper piece 12. Further, the threaded rod is in threaded engagement with an internally threaded hole in the form of a not closer shown sleeve-shaped nut which is arranged on the underside of a plate 26 mounted horizontally between the rear portions 19 of the timber support's carrier console pieces 17 and upper through-axis 20'. The threaded rod 25 is rotatably drivable by means of an electric stepping motor 26 mounted on the associated support part 2 which is formed as a hollow shell- or box-shaped body. A rotatable shaft of the stepping motor 26 extends downwards through a hole in the support part into its hollow interior and is provided with a toothed belt wheel 27. Likewise, the threaded rod 25 is provided with a toothed rack wheel 28 at its lower end in the hollow interior of the support part and a toothed belt 29 extends between and around the respective threaded belt wheels of the stepping motor and the threaded rod. A device formed in the above-described manner results in that at a rotating drive of the stepping motor thus also the threaded rod is rotated at a speed and rotation angle which is determined, in addition to the speed and rotation angle of the stepping motor, also of the cam belt transmission's gearing, i.e. the ratio of the number cogs on the stepping motor and the threaded rod's threaded belt wheel. Thereby, the timber carrier 8 will optionally be displaced upward or downward depending upon the direction of rotation of the stepping motor and threaded rod and be held unturnably extended perpendicular to the front side of the post element by that the rollers 21', 21" rotate against the forward respectively rearward facing abutment surfaces in the guide slits 22.

In order to, with accuracy, ensure a 90° angle between the front side 9 of the post element 1 and the upper side 10 of the timber carrier 8, the tilt of the timber carrier's four-side bar 16 is adjustable relative to the console pieces 17.

This is accomplished by that in a rear and a front end portion of the timber carrier, a bolt 30 extends through the timber carrier and further defined through an elongated hole 31 in relation to the horizontal plane through each console piece, which are visible in FIGS. 3-6, as well as through an equally elongated and inclined hole 32 in each side wall of the four-side bar 16 of FIG. 6 but where the slope is in the opposite direction to the holes 31 in the console pieces 17. By displacing the position of the respective bolts 30 in the longitudinal extent of the timber carrier and tightening the bolts, thus the height of the timber carrier in each end portion can be adjusted with great accuracy so that the top surface 10 of the timber carrier is perpendicular to the front surface 9 of the front piece 14 of the post element. In order to further reinforce the four-side bar, an inner beam 33 is arranged between the four-side bar's upper and lower walls, wherein the inner beam is performed not shown elongated and inclined grooves which in size and location correspond to the holes 32 in the four-side bar's respective side wall.

Figure 8:
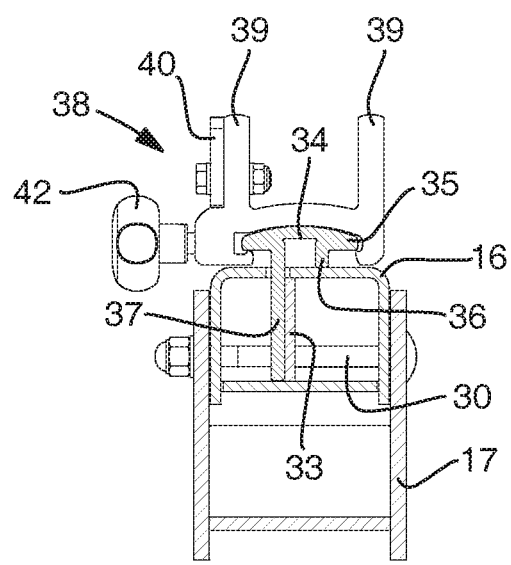
FIG. 8 is a cross section through a timber carrier along the line VIII-VIII in FIG. 3.

The timber carrier is further provided with a timber carrier profile 34 on the upper side. The design and placement of the timber carrier profile is best seen in FIG. 8, and more particularly, it comprises an upper upwardly convex portion 35 which extends along substantially the entire length of the timber carrier and which on the underside is formed with two downwardly extending beam portions 36, 37 along the upper portions full length. One beam portion 36 has a short vertical length and ends above the four-side bar of the timber carrier while the second beam portion 37 has a long vertical length and extends through a slit in the timber carrier's four-side bar down to slightly above the lower wall of the four-side bar.

Figure 3:
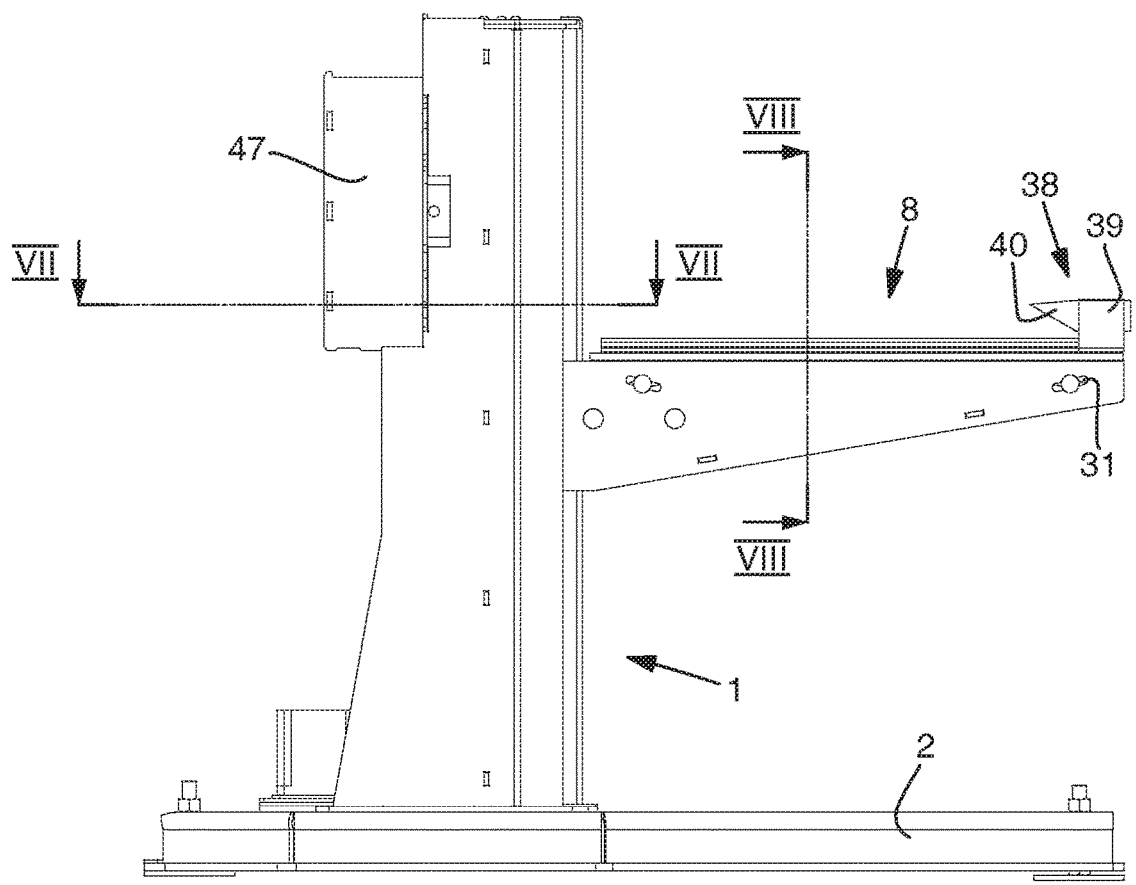
FIG. 3 is a side view of a post element according to the invention.
Figure 4:
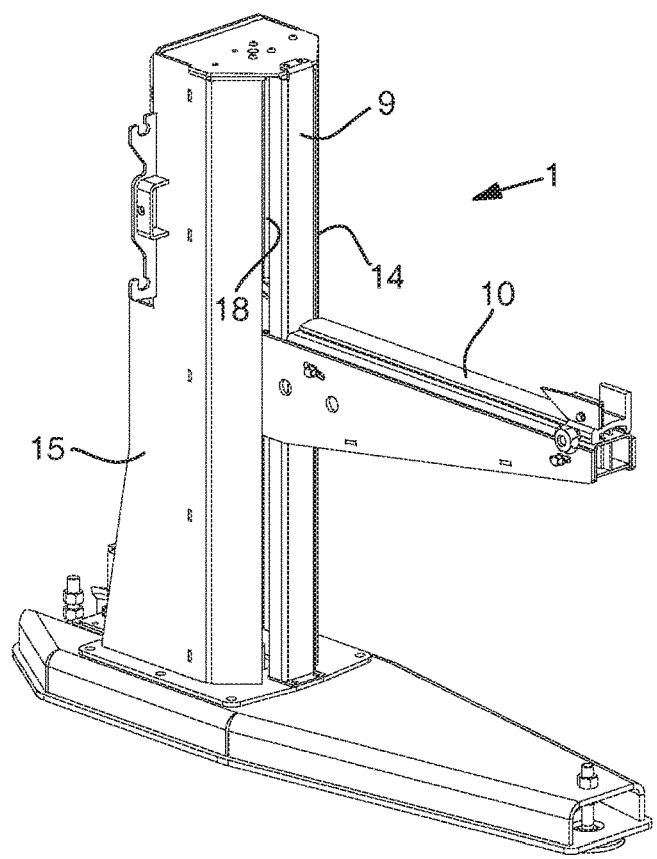
FIG. 4 is a perspective view of a post element.
Figure 5:
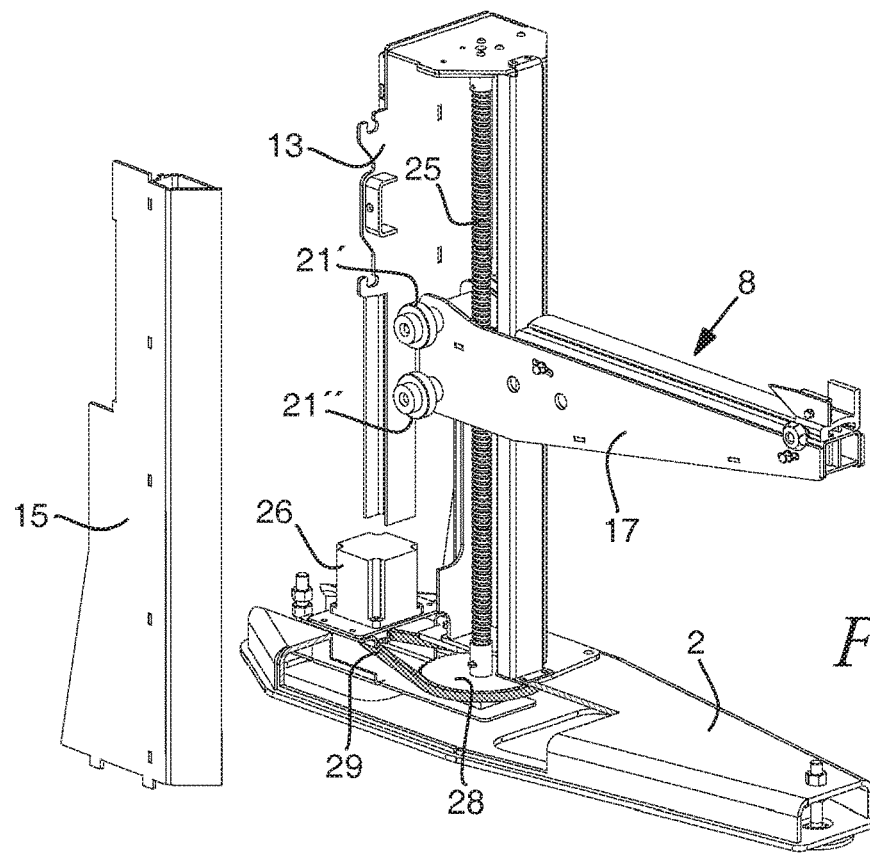
FIG. 5 is a partially cut perspective view according to FIG. 4 with one side piece removed.

A support means 38 is further displaceably and lockably arranged on the timber carrier profile such that the support means on the underside exhibits a horizontal inward open groove on each side which are adapted to grip the longitudinal edges of the timber carrier profile as shown in FIG. 8. Hereby, the support means can be displaced along the timber carrier profile and be arranged with its two upright flange portions 39 and a tip-shaped plate 40, as shown in FIG. 3, against a timber piece to be sawn so that the timber piece is pressed against the front side of the post element during sawing. The locking of the support means is accomplished by a hand-operated screw 42 which can be screwed from one side through the support means to abutment against one edge of the timber carrier profile.

Figure 9:
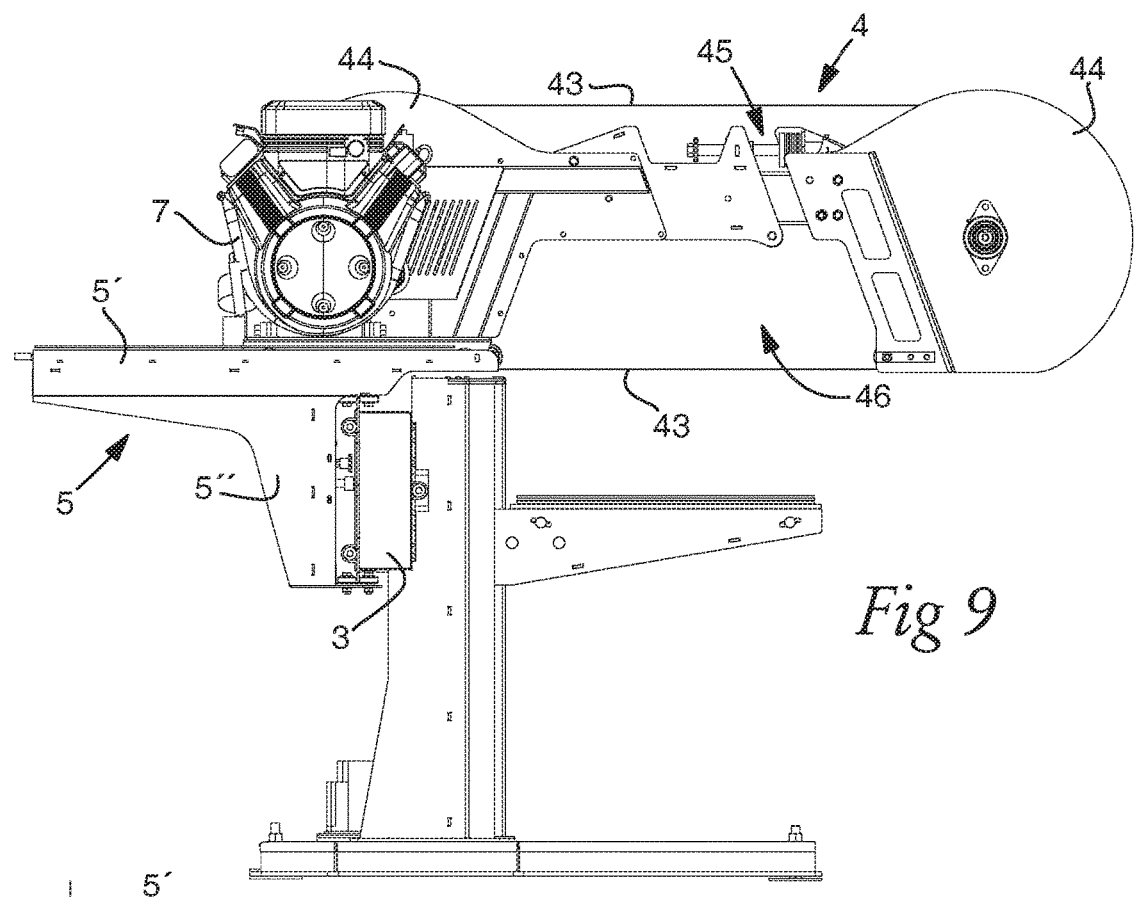
FIG. 9 is a side view of a complete saw device with the sleigh assembly and saw assembly mounted.
Figure 10:
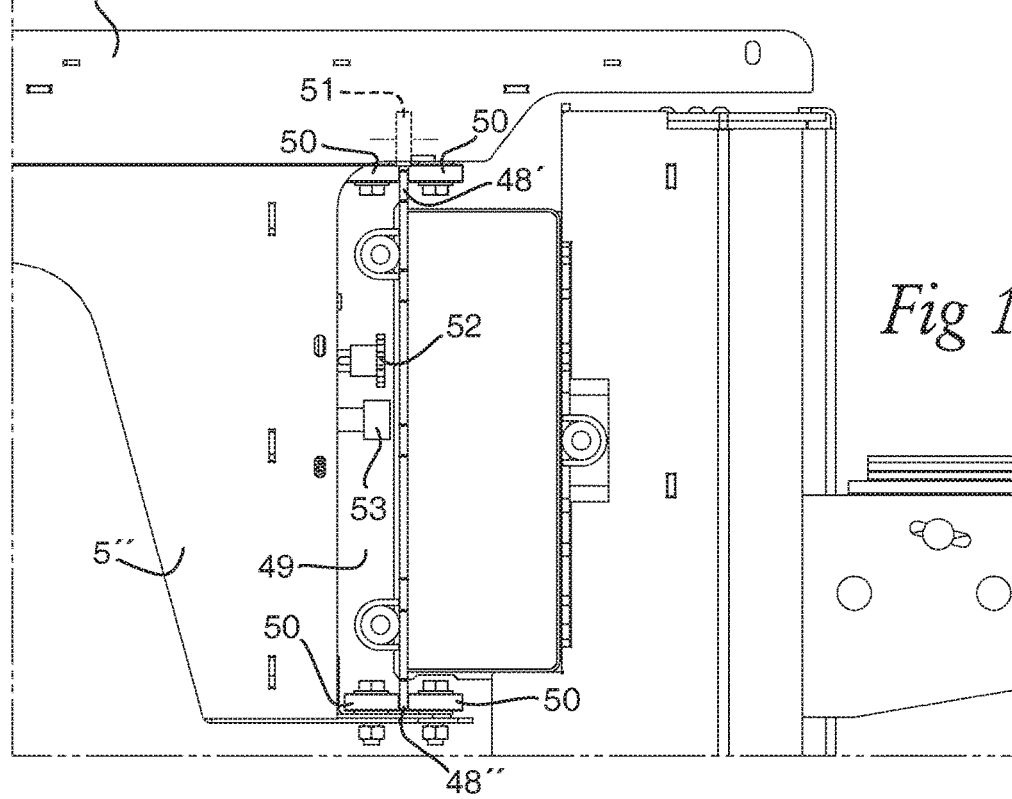
FIG. 10 is an enlarged detail view of the connection between the saw device's guide beam and the sleigh assembly.
Figure 11:
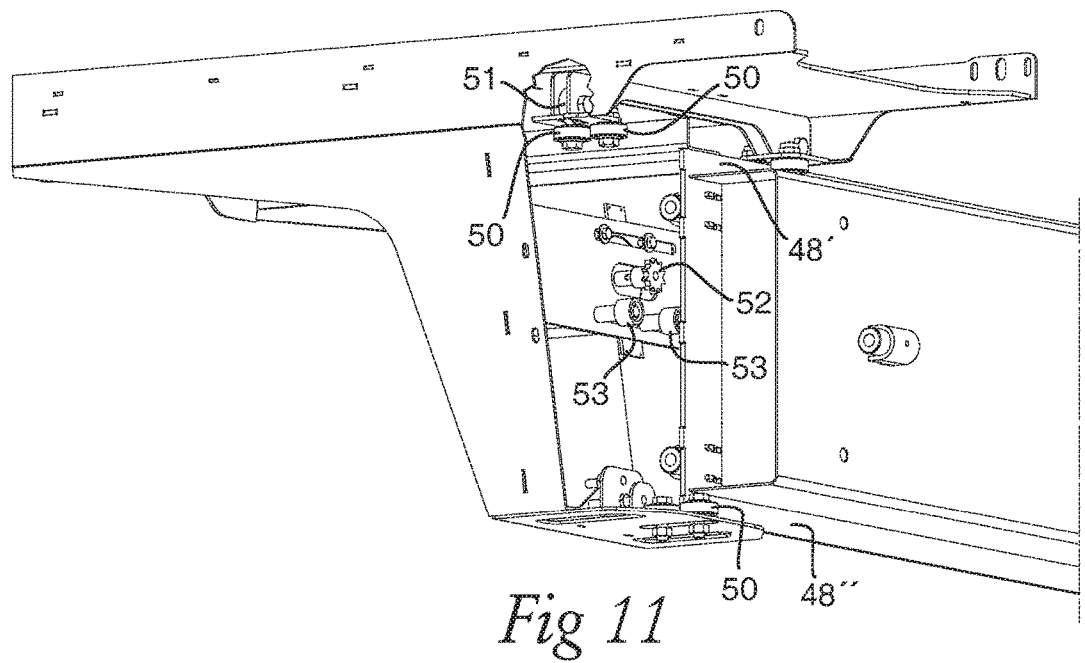
FIG. 11 is a partially cut perspective view according to FIG. 10.

Thereafter, reference is made to FIG. 9-11 for a description of the saw assembly's configuration and mounting at the saw device. In the embodiment shown, the saw assembly 4 is a band saw comprising a rotatable endless band saw blade 43 which rotates about two runner wheels 44 and is driven by a combustion engine 7, preferably a gasoline engine. The tension of the band saw blade can be regulated by means of a tensioning device 45 with which the distance between the running wheels can be varied to allow for the change of band saw blades and for obtaining the correct band tension for sawing of timber pieces. In a downwardly faced area between the runner wheels, a free saw area 46 is defined for the timber to be sawed, in which the band saw blade 43 runs freely over a relatively long distance and with the free saw area 46 above it. The saw assembly is carried on the sleigh device 5 which in turn is displaceably carried on the saw device via the guide beam 3 which is mounted in an upper portion of the respective post element. In case the saw device has three post elements, as in the illustrated exemplifying embodiment, the guide beam 3 may suitably have a length of about 6 m and be composed of several guide beam sections which in the embodiment shown are intersected at respective post elements 1 and a shorter guide beam portion which is joined together with one end of the guide beam. As can be seen, the guide beam 3 has a substantially four-sided rectangular box profile in cross section and is oriented with its largest cross-section in the vertical direction. It is furthermore mounted, by means of a joining and mounting arrangement not shown in detail, comprising a joint plate 47 visible in FIGS. 3, 7 and 12 on a rear side of post elements 1 and the rear, from the post elements faced side of the guide beam is provided with an upwardly and downwardly directed flange edge 48' and 48" respectively. The sleigh assembly 5 is substantially T-shaped in cross section and exhibits an upper portion 5' with a substantially horizontal upper side, which carries the saw assembly 4 and a downwardly directed portion 5" which in a forward edge is formed with a recess 49 which in the sleigh assembly's mounted state grips on the guide beam's flange edges 48', 48". More specifically, the sleigh assembly 5 is provided with a total of six horizontally rotatable wheels or rollers 50, four in the upper and two in the lower part of the recess which are in pairs oppositely mounted and rotatable in a horizontal plane about a respective vertical axis of rotation and which in mounted state in pairs abut and roll toward each side of the lower and upper flange edge 48', 48" of the guide beam. Further, the sleigh arrangement is provided with two rollers 51 or wheels (one of which is indicated in FIG. 10 and also visible in FIG. 11), which are rotatable in a vertical plane about a horizontal axis of rotation and which are mounted inside the horizontal upper portion of the sleigh arrangement device and abut rolling from above the upper flange edge of the guide beam 48'. By means of a sleigh arrangement and guide beam thus arranged with both horizontal and vertically rotating rollers of the sleigh arrangement and an upwardly and downwardly directed flange edge of the guide beam, the sleigh arrangement will be unturnably carried and with substantially non-slip on the guide beam, but despite this be easy to displace along the guide beam. Preferably, the horizontal rotating rollers of the sleigh arrangement are adjustable forwards and backwards in the horizontal direction to enable accurate setting of the band saw blade strictly perpendicular to the front surfaces 9 of the post elements and parallel to the upper surfaces 10 of the timber carriers. In the figures, also a sprocket wheel 52 and two sprocket guide wheels 53 are visible around which a chain (not shown) is intended to extend to provide automatic operation of the sleigh arrangement during sawing by rotation of the sprocket wheel 52 by means of a non-shown electric motor. However, it would also be possible to displace the sleigh arrangement manually by hand during sawing.

Figure 12:
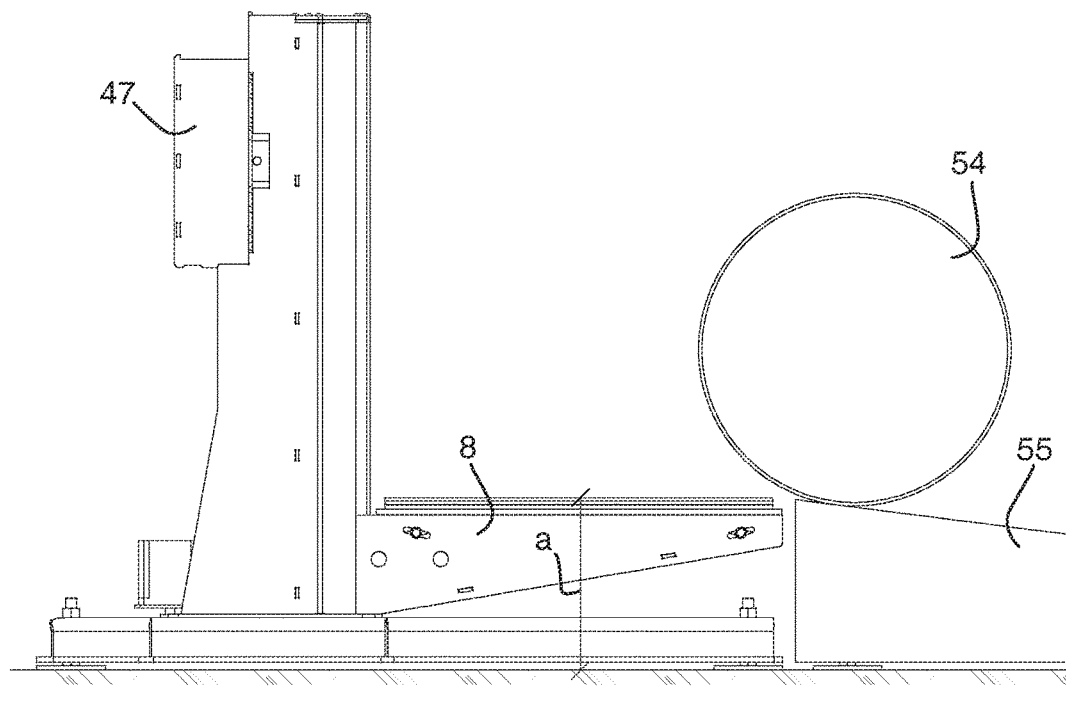
FIG. 12 is a side view of a post element with the timber carrier in a maximally lowered position and a log to be sawed on the way to be rolled on to the timber carrier.

A great advantage of this saw device in relation to the prior art of similar construction is that, due to the height adjustment of the timber carriers is performed by means of a threaded rod 25, the timber carriers 8 can be lowered to a level substantially lower than before. This is illustrated in FIG. 12 and in the illustrated embodiment, in the maximum immersed position, the distance a between the support and the upper carrying surface of the respective timber carriers is only about 250 mm This makes it considerably easier for a person using the saw device to manually lift a heavy log 54 on the timber carriers 8, or alternatively to simply arrange a sloping plan of e.g. wedge shaped sawed beams 55 as illustrated in FIG. 12 for rolling the logs up on the timber carriers.

Figure 13:
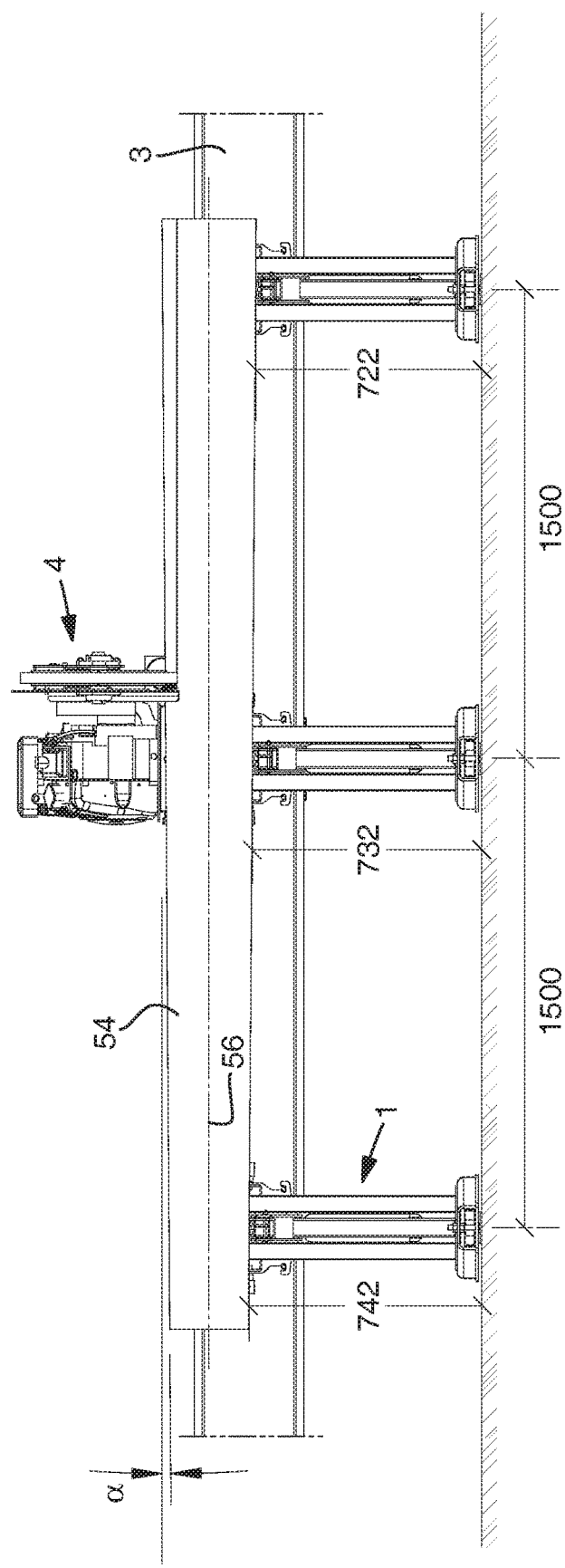
FIG. 13 is a front view of the saw device's timber side with a log to be sawed placed on the timber carriers, illustrating an initial setting of the timber carriers to saw a first cut.

Another great advantage is the ability to easily and reliably make the height setting steplessly or almost steplessly with very small steps, e.g. in increments of about 0.1 mm, if the threaded rod of each post element is driven by an electric stepping motor as in the here showed embodiment. With electrically driven stepping motors it is also possible to easily achieve a particularly advantageous and time-saving combination of manual and automatic setting of the timber carriers. This is illustrated in e.g. in FIG. 13, in which the saw device is shown in a front view during sawing of a round log 54, which naturally exhibits a taper $\alpha°$ towards one end and more specifically to the left in FIG. 13. When sawing planks and boards of a round log, it is generally preferred to lay the saw cuts parallel to the core of the stock 56 to allow a saw cut to be centred in the core, thereby avoiding drying fractures in the timber pieces closest to the core. Thus, when sawing the first cut in the round log, the height settting of the timber supports can be made manually so that the core is located horizontally and parallel to the guide beam. This is illustrated in FIG. 13 where it is seen that the height between the support and the underside of the log, which coincides with the upper surface of the timber carriers, differs 20 mm between the left and right timber carriers. Once this first cut has been sawn, either the continued sawing can be done from the same side of the log, whereby the timber carriers are automatically raised exactly the same distance, i.e. with the exact same number of steps of the stepping motors such that the threaded rods are drivable in sync, from the displayed setting for each saw section being made, or alternatively, the log is turned so that the first sawed planar surface abuts the timber carriers, after which the timber carriers are first set at exactly the same distance from the support and thereafter are automatically raised exactly the same distance for each saw cut.

Figure 14:
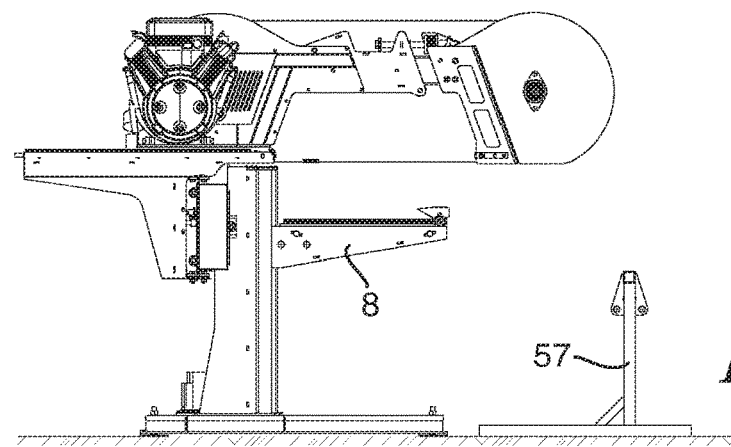
FIGS. 14-16 are side views of the saw device illustrating mounting of wheels at the same to facilitate displacement.
Figure 15:
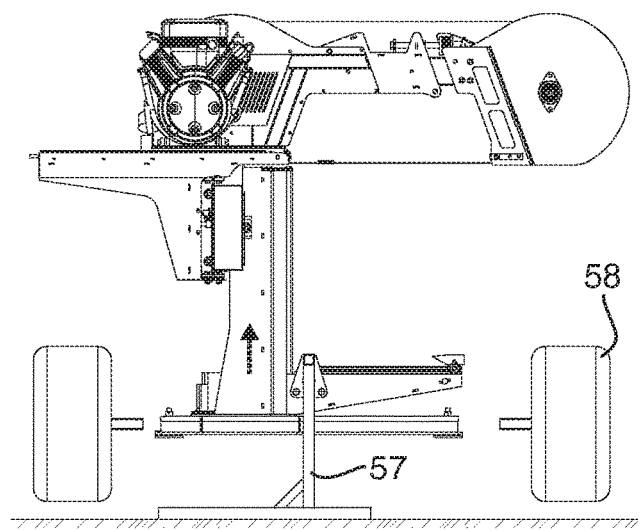
Figure 16:
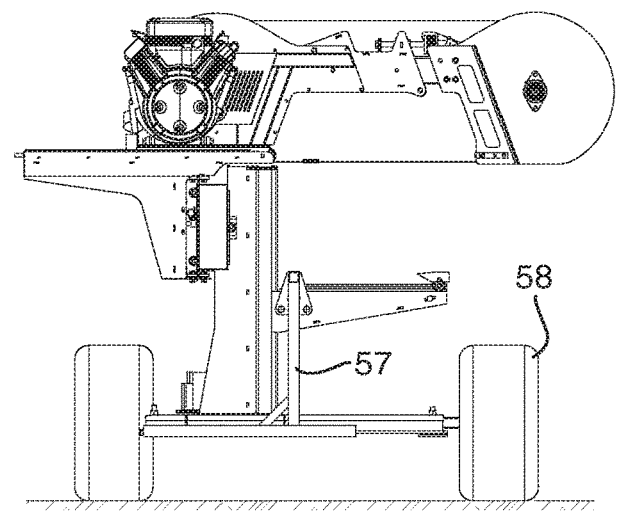

An additional advantage of achieving the height setting of the timber carriers by means of a threaded rod is that, unlike other previously known height setting mechanisms for saw devices of this type, the height setting both upward and downward is performed with a force, i.e. the timber carriers are pressed upwardly and pulled downwards with a force. In previous saw devices, the lowering of the timber carriers has been done solely by gravity. This can be utilized as illustrated in FIGS. 14-16 so that the entire saw device can be lifted from the ground by means of two lifting racks 57 attached to the two outermost timber carriers with these in raised condition according to FIG. 14. Next, the timber carriers are moved downward by rotation of the threaded rods so that the entire saw device is lifted upwardly and rests against the support on the lifting rack 57 of FIG. 15. In this position, for example, wheel 58 can be attached to suitably one or two of the post elements' supports, i.e. to the support parts referred to as 2, either two wheels on the centre post element or two wheels on each of the outermost post elements. Thereafter the timber carriers are raised whereby the saw device will be lowered to the support, e.g. the ground or a floor, etc., so that it will be carried by the wheels 58 as seen in FIG. 16. Thus, the saw device can easily be moved by being rolled on the wheels, either by hand or by being coupled for a vehicle by means of a not shown towing arrangement attached to the saw device.

The invention claimed is:

1. A saw device for split sawing of elongated timber elements, comprising at least two upright post elements at horizontal distance from each other, a lower portion of the post elements being adapted to support the saw device, an elongated, lying guide beam which is carried in upper portions of the post elements and which is adapted to displaceably carry a saw assembly along the longitudinal extent of the guide beam, and at least two lying timber carriers each projecting perpendicular from and being vertically displaceable along a respective one of the post elements, wherein each of the timber carriers is configured as a console beam that in a rear portion of the timber carriers is upwards and downwards displaceable and is unturnably connected with the respective one of the post elements and is displaceable by means of a rotatable, threaded rod which is rotatably beared in the respective one of the post elements, extends in its vertical extent and grips into a threaded hole in the rear portion of the timber carrier, wherein the timber carriers are configured to move the elongated timber elements relative to the saw assembly.

2. The saw device according to claim 1, wherein each of the threaded rods is rotatably drivable by means of an electric motor.

3. The saw device according to claim 2, wherein the electric motor is a stepping motor.

4. The saw device according to claim 1, wherein the threaded rods are drivable in sync.

5. The saw device according to claim 1, wherein each of the post elements in its lower end is provided by a support part through which the saw device is displaceably arrangeable at a support.

6. The saw device according to claim 5, wherein each of the threaded rods is rotatably drivable by means of an electric motor, and wherein the electric motor for driving of the threaded rod in the respective post element is mounted at the support part.

7. The saw device according to claim 1, wherein the guide beam is configured with an upwardly and downwardly directed flange edge along which the saw arrangement is displaceable.

8. The saw device according to claim 1, further comprising two lift racks which are mountable at the timber carriers and by which the saw device is liftable at lowering of the timber carriers.

9. The saw device according to claim 8, further comprising two wheels which are mountable on at least a support part in the saw device's raised state for facilitating displacement of itself.

* * * * *